(12) United States Patent  (10) Patent No.: US 7,404,506 B1
Ross  (45) Date of Patent: Jul. 29, 2008

(54) SYSTEM AND RELATED METHODS FOR PREVENTING BACK INJURY

(76) Inventor: Anthony C. Ross, 3546 Maybank Hwy, John's Island, SC (US) 29455

( * ) Notice: Subject to any disclaimer, the term of this patent is extended or adjusted under 35 U.S.C. 154(b) by 186 days.

(21) Appl. No.: 10/936,099

(22) Filed: Sep. 7, 2004

Related U.S. Application Data

(60) Provisional application No. 60/500,713, filed on Sep. 5, 2003.

(51) Int. Cl.
*A45C 13/00* (2006.01)
(52) U.S. Cl. ........................ 224/576; 190/115; 177/164
(58) Field of Classification Search ................. 224/576; 177/164; 190/115
See application file for complete search history.

(56) References Cited

U.S. PATENT DOCUMENTS

| | | | |
|---|---|---|---|
| 2,937,016 A | | 5/1960 | Westman |
| 3,090,454 A | * | 5/1963 | Farrar et al. ................. 177/131 |
| 3,960,300 A | * | 6/1976 | Dickler ........................ 224/629 |
| 5,107,854 A | * | 4/1992 | Knotts et al. ................ 600/592 |
| 5,873,506 A | * | 2/1999 | Golling et al. .............. 224/645 |
| 6,273,863 B1 | * | 8/2001 | Avni et al. ................... 600/587 |
| 6,281,800 B1 | * | 8/2001 | Sizemore .................... 340/574 |
| 6,712,249 B2 | * | 3/2004 | Magnusson et al. ......... 224/576 |
| 7,156,918 B2 | * | 1/2007 | Marks ........................ 177/168 |
| 2002/0051586 A1 | * | 5/2002 | Orndorff et al. ............... 384/98 |
| 2002/0195282 A1 | * | 12/2002 | Thadani ...................... 177/148 |
| 2005/0051586 A1 | * | 3/2005 | Siwak et al. ................ 224/576 |

FOREIGN PATENT DOCUMENTS

| | | | |
|---|---|---|---|
| EP | 2385142 A | * | 8/2003 |
| GB | 1308915 | | 3/1973 |
| GB | 2385142 A | * | 8/2003 |
| GB | 2385142 | | 8/2006 |
| WO | WO-98/31250 | * | 7/1998 |
| WO | WO 03/100360 A1 | * | 12/2003 |

OTHER PUBLICATIONS

Ghosh, Amal (European Patent Application No. GB 2 385 142 A) Published: Aug. 13, 2003. Title: Lugguage Weighing Gadget.*
Creamer, Beverly, "Heavy backpacks may harm kids, doctors warn", The Honolulu Advertiser, (Sep. 6, 2001).
Sheir-Neiss, Geraldine I., et al., "The Association of Backpack Use and Back Pain in Adolescents", SPINE vol. 28, No. 9, pp. 922-930, Lippincott Williams & Wilkins, Inc., (2003).

* cited by examiner

*Primary Examiner*—Nathan J Newhouse
*Assistant Examiner*—Lester L Vanterpool

(57) ABSTRACT

A system and related methods for preventing back injury involving backpacks, wherein a weighing feature is provided for weighing the payload of the backpack and determining whether the payload is above a predetermined weight limit, and an alarm (e.g. audio, visual and/or tactile) is provided for alerting a user and/or a guardian that the weight of the payload is too great and must be reduced prior to safely carrying the backpack.

27 Claims, 6 Drawing Sheets

SYSTEM AND RELATED METHODS FOR PREVENTING BACK INJURY

CROSS-REFERENCES TO RELATED APPLICATIONS

The present application is a U.S. Non-Provisional Patent Application of and claims the benefit of priority from commonly owned and co-pending U.S. Provisional Patent Application Ser. No. 60/500,713 (filed Sep. 5, 2003), the entire content of which is hereby expressly incorporated by reference into this disclosure as if set forth fully herein.

BACKGROUND OF THE INVENTION

I. Field of the Invention

The present invention relates generally to the prevention of back injury and, more particularly, to a system and related methods for preventing back injury associated with backpack use.

II. Discussion of the Prior Art

While most episodes of back pain are self-limited, 5% to 10% of cases will become chronic. These chronic conditions account for 90% of the healthcare expenditures for back pain and amount to $50 to $80 billion dollars annually. Among those subject to this problem are the over 40 million children (in the US alone) who use backpacks to transport belongings to, from and within school. Although it is recommended that a loaded backpack weigh no more than 10% to 15% of a student's body weight, the average student carries a backpack weighing almost one forth of his or her body weight and almost thirty percent of all students typically carry backpacks weighing up to one third of their body weight at least once a week. As a result, emergency room visits by children for back pain due to backpacks have increased over time, with approximately half of all injuries occurring to children ranging from 5-14 years old. In addition to back pain caused by overloaded backpacks, studies suggest a correlation between spinal deformity (e.g. scoliosis) due to excessive weight in backpacks. Moreover, adolescents who have experienced back pain are at an increased risk for experiencing back pain as adults, which will only add to the already large burden on healthcare systems worldwide.

Efforts to avoid or minimize back injuries due to overloaded backpacks have largely revolved around eliminating the need to carry the backpack, such as by adding wheels to pull rather than carry the backpack. While an admirable attempt (and to a degree helpful), in practice this effort has been less than successful, with many children reluctant to use the wheeled feature to pull the backpack. A further disadvantage of the wheeled backpack approach is that the student usually has to lift the backpack at some point, whether to place the backpack in a locker or into a transportation vehicle such as a school bus, which subjects their back to a potentially injurious overload condition.

The present invention is directed at overcoming, or at least improving upon, the disadvantages of the prior art.

SUMMARY OF THE INVENTION

The present invention accomplishes this by providing a system and related methods for preventing back injury. A first aspect of the present invention involves equipping a backpack with a weight assessment system. The weight assessment system may comprise any number of systems or devices (currently available and/or developed in the future) capable of determining the weight of the backpack. This may be accomplished by determining whether the weight of the loaded backpack is below and/or above a predetermined threshold, which may signify a "safe weight" and/or an "unsafe weight." The predetermined threshold may be set pre-set (such as at the factory) and/or selected by the user (e.g. child) and/or a guardian (e.g. parent and/or school teacher). The weight assessment system may be provided as an integral part of the backpack handle, one or more strap(s) used to carry the backpack on the back or shoulder of the user and/or the backpack housing itself. The weight assessment system may also be provided as an after-market product capable of being employed with off-the-shelf backpacks (e.g. retro-fit).

A second aspect of the present invention involves assessing the weight of the backpack after it has been loaded but before use or, in other words, after a proposed payload of books, computer, supplies, etc. . . . have been placed within the backpack but before it has been placed on the back or shoulder of the user. This may be accomplished, by way of example only, by having the user and/or guardian temporarily lift the loaded backpack (such as via the handle, one or more of the straps and/or the backpack housing if the weight assessment system is coupled to or forms part of that component) and allowing the weight assessment system to assess the weight of the loaded backpack. The weight assessment system may accomplish this in any number of suitable fashions, including but not limited to mechanical devices or components (e.g. scales, springs, etc. . . . ), electrical devices or components (e.g. strain gauges, piezoelectric devices, etc. . . . ) and/or any combination of the two. By performing this weight assessment prior to use, the present invention advantageously eliminates the unnecessary and undesirable overloading of the user's back due to an overloaded backpack.

A third aspect of the present invention involves alerting the user and/or guardian if the weight of the backpack is safe and/or unsafe. This may be accomplished, by way of example only, by providing the weight assessment system with any number of alarm features. These may include, but are not necessarily limited to, an audio alarm so the user and/or guardian can hear a tone or sound indicating a safe and/or unsafe loading condition, a visual alarm so the user and/or guardian can see a light or graphic indicating a safe and/or unsafe loading condition and/or a tactile alarm so the user and/or guardian can feel a vibration or pulse indicating a safe and/or unsafe loading condition. If a safe loading condition exists (meaning the backpack load is less than a predetermined threshold), then the user may use the backpack as intended. If an unsafe loading condition exists (meaning the backpack load is greater than a predetermined threshold), then part of the load should be removed from the backpack and the process repeated until a safe loading condition exists, after which point the backpack may be used as intended.

Any number of additional features may be provided in addition to the weight assessment feature and methodology described above. These may include, but are not necessarily limited to, survival features (e.g. whistle, compass, global positioning system, cellular telephone, mirror, flashlight, etc. . . . ) and multi-media features (e.g. MP3 music player, digital file storage, alarm clock, calculator, voice recorder, personal data, laser, video games, etc. . . . ). By "packaging" the back injury prevention features with such additional features, the present invention may further enhance the commercial appeal to parents and children alike, which will advantageously increase the likelihood of preventing back injury due to backpack overloading.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The back injury prevention system of the present invention disclosed herein boasts a variety of inventive features and components that warrant patent protection, both individually and in combination.

Figure 1:
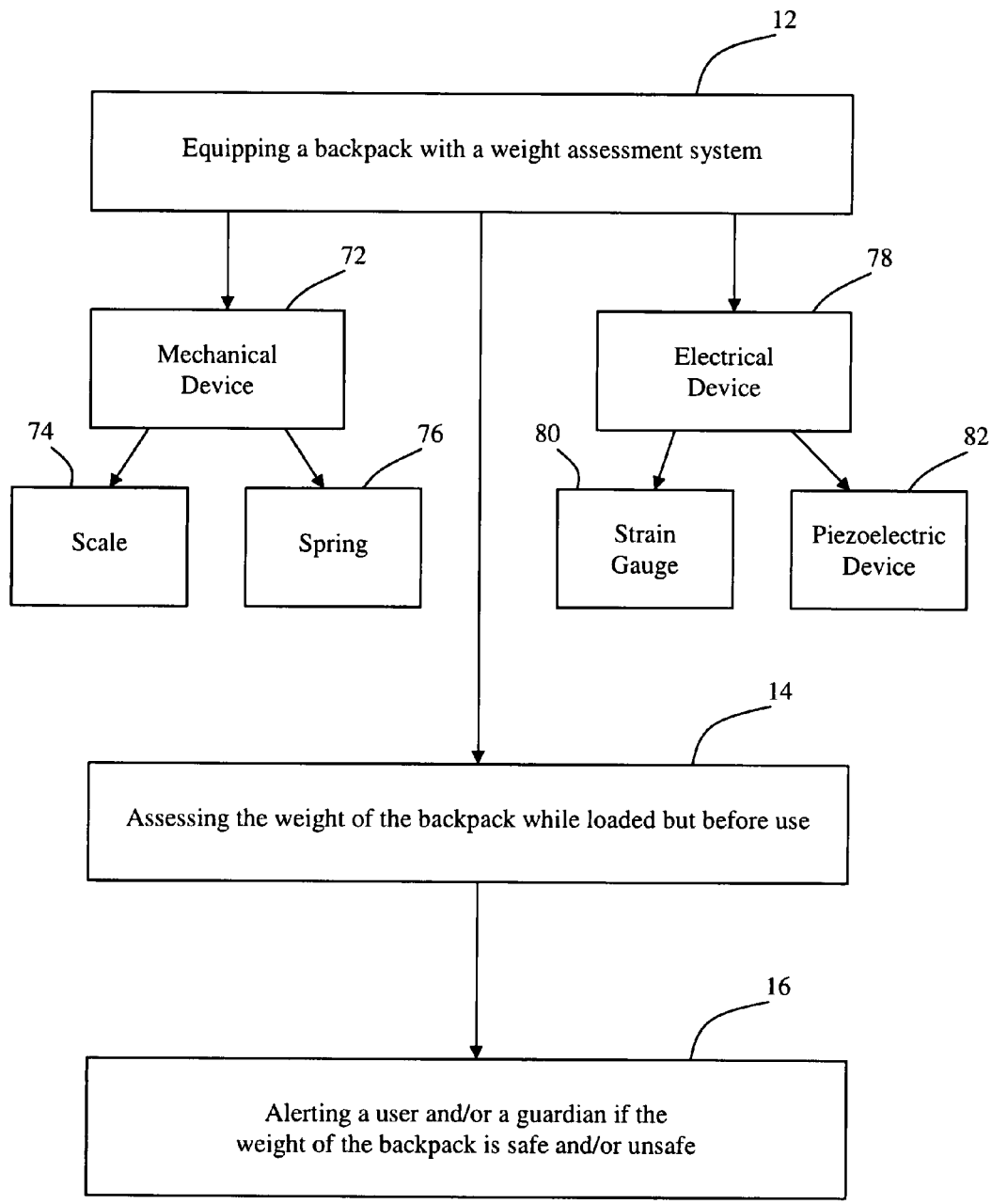
FIG. 1 is a flow chart illustrating a method of preventing back injury according to one embodiment of the present invention.

FIG. 1 is a flow chart illustrating a method 10 of preventing back injury according to one embodiment of the present invention. The first step 12 involves equipping a backpack with a weight assessment system. As used herein, the term "backpack" means a bag, case, or similar structure carried by one or more straps on the back or shoulder of a user (including so-called "laptop cases" for carrying computers, which have a single shoulder strap). Although described below with regard to a specific type of backpack (set forth by way of example only), the backpack may comprise any number of backpacks, including those currently commercially available and/or those developed in the future. The weight assessment system may comprise any number of systems or devices (currently available and/or develop in the future) capable of determining the weight of the backpack, including but not limited to mechanical devices 72 or components (e.g. scales 74, springs 76, etc. . . . ), electrical devices 78 or components (e.g. strain gauges 80, piezoelectric devices 82, etc. . . . ) and/or any combination of the two. This may be accomplished by determining whether the weight of the loaded backpack is below and/or above a predetermined threshold, which may signify a "safe weight" and/or an "unsafe weight." The predetermined threshold may be set pre-set (such as at the factory) and/or selected by the user (e.g. child) and/or a guardian (e.g. parent and/or school teacher). The weight assessment system may be provided as an integral part of the backpack handle, one or more strap(s) used to carry the backpack on the back or shoulder of the user and/or the backpack housing itself. The weight assessment system may also be provided as an after-market product capable of being employed with off-the-shelf backpacks (e.g. retro-fit).

The second step 14 involves assessing the weight of the backpack after it has been loaded but before use or, in other words, after a proposed payload of books, computer, supplies, etc. . . . have been placed within the backpack but before it has been placed on the back or shoulder of the user. This may be accomplished, by way of example only, by having the user and/or guardian temporarily lift the loaded backpack (such as via the handle, one or more of the straps and/or the backpack housing if the weight assessment system is coupled to or forms part of the component) and allowing the weight assessment system to assess the weight of the loaded backpack. As will be explained in greater detail below, the weight assessment system may accomplish this in any number of suitable fashions, including but not limited to mechanical devices 72 or components (e.g. scales 74, springs 76, etc. . . . ), electrical devices 78 or components (e.g. strain gauges 80, piezoelectric devices 82, etc. . . . ) and/or any combination of the two. By performing this weight assessment prior to use, the present invention advantageously eliminates the unnecessary and undesirable overloading of the user's back due to an overloaded backpack.

The third step 16 involves alerting the user and/or guardian if the weight of the backpack is safe and/or unsafe. This may be accomplished, by way of example only, by providing the weight assessment system with any number of alarm features. These may include, but are not necessarily limited to, an audio alarm so the user and/or guardian can hear a tone or sound indicating a safe and/or unsafe loading condition, a visual alarm so the user and/or guardian can see a light or graphic indicating a safe and/or unsafe loading condition and/or a tactile alarm so the user and/or guardian can feel a vibration or pulse indicating a safe and/or unsafe loading condition. If a safe loading condition exists (meaning the backpack load is less than a predetermined threshold), then the user may use the backpack as intended. If an unsafe loading condition exists (meaning the backpack load is greater than a predetermined threshold), then part of the load should be removed from the backpack and the process repeated until a safe loading condition exists, after which point the backpack may be used as intended.

Any number of additional features may be provided in addition to the weight assessment feature and methodology described above. These may include, but are not necessarily limited to, survival features (e.g. whistle, compass, global positioning system, cellular telephone, mirror, flashlight, etc. . . . ) and multi-media features (e.g. MP3 music player, digital file storage, alarm clock, calculator, voice recorder, personal data, laser, video games, etc. . . . ). By "packaging" the back injury prevention features with such additional features, the present invention may further enhance the commercial appeal to parents and children alike, which will advantageously increase the likelihood of preventing back injury due to backpack overloading.

Figure 2:
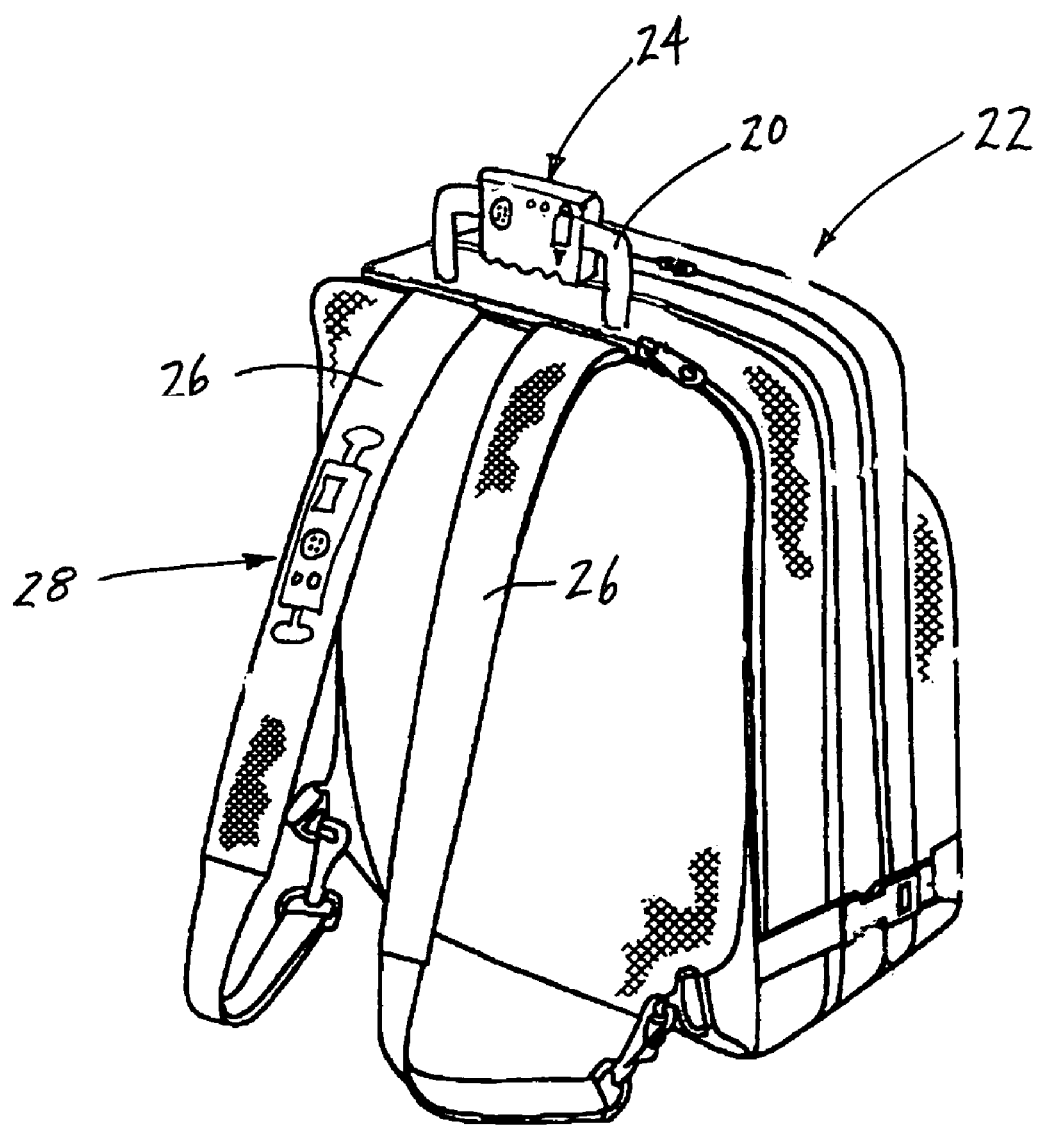
FIG. 2 is a rear perspective view of a backpack equipped with at least one weight assessment system according to one embodiment of the present invention.
Figure 3:
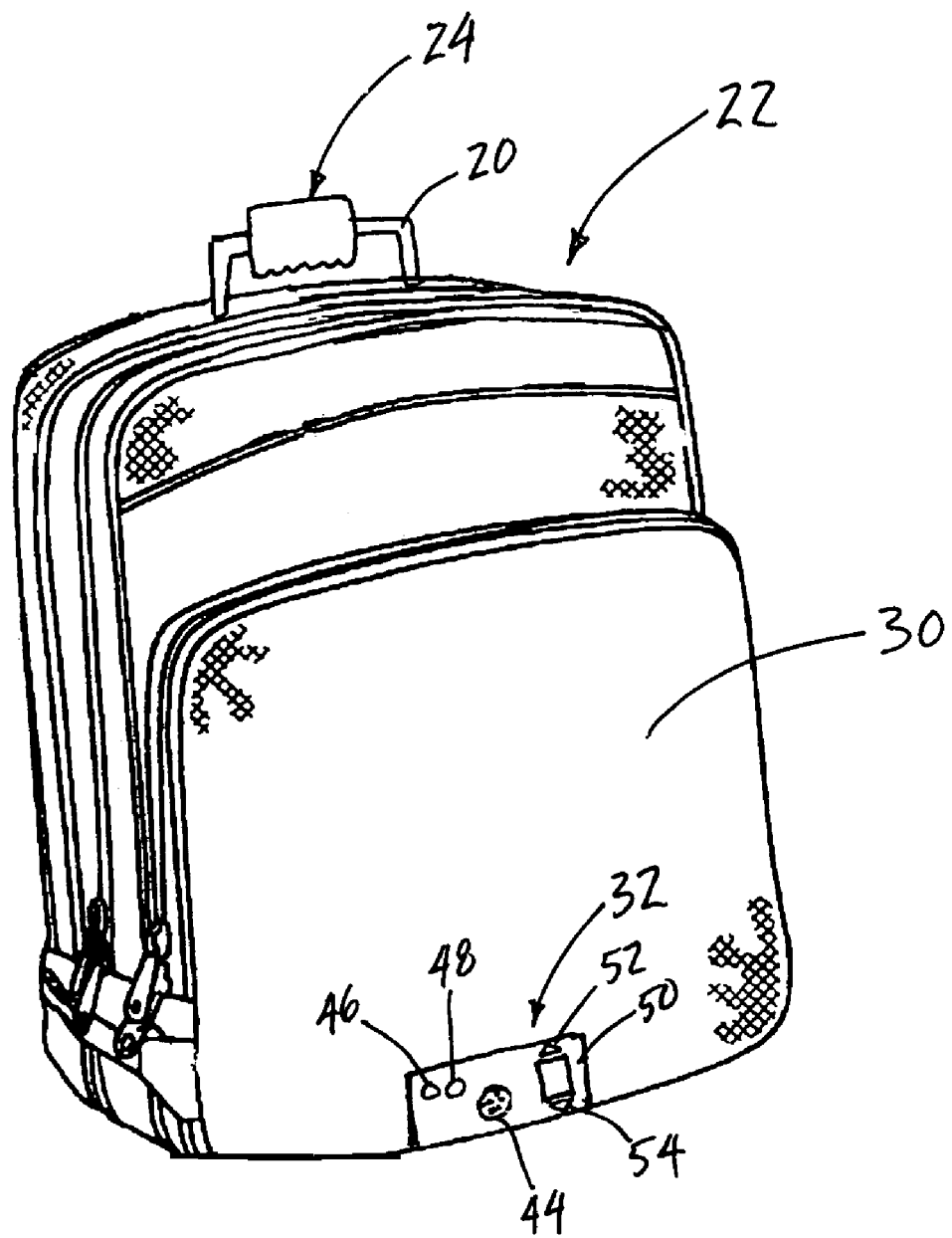
FIG. 3 is a front perspective view of a backpack equipped with at least one weight assessment system according to one embodiment of the present invention.

The present invention may be carried out in any number of suitable fashions without departing from the scope of the present invention. FIGS. 2 and 3 illustrate, by way of example only, three manners: handle-style, strap-style, and housing-style. The handle-style involves equipping a handle 20 of backpack 22 with a weight assessment system 24 according to one embodiment of the present invention (described below with reference to FIG. 4). The strap-style involves equipping at least one strap 26 of backpack 22 with a weight assessment system 28 according to a second embodiment of the present invention (described below with reference to FIG. 5). As shown in FIG. 3, the housing-style involves equipping a housing 30 of backpack 22 with a weight assessment system 32 according to a third embodiment of the present invention (described below with reference to FIG. 6). It will be appreciated that, although shown together on backpack 22, the present invention may involve the use of a single one of the weight assessment systems 24, 28, 32 without departing from the scope of the invention.

Figure 4:
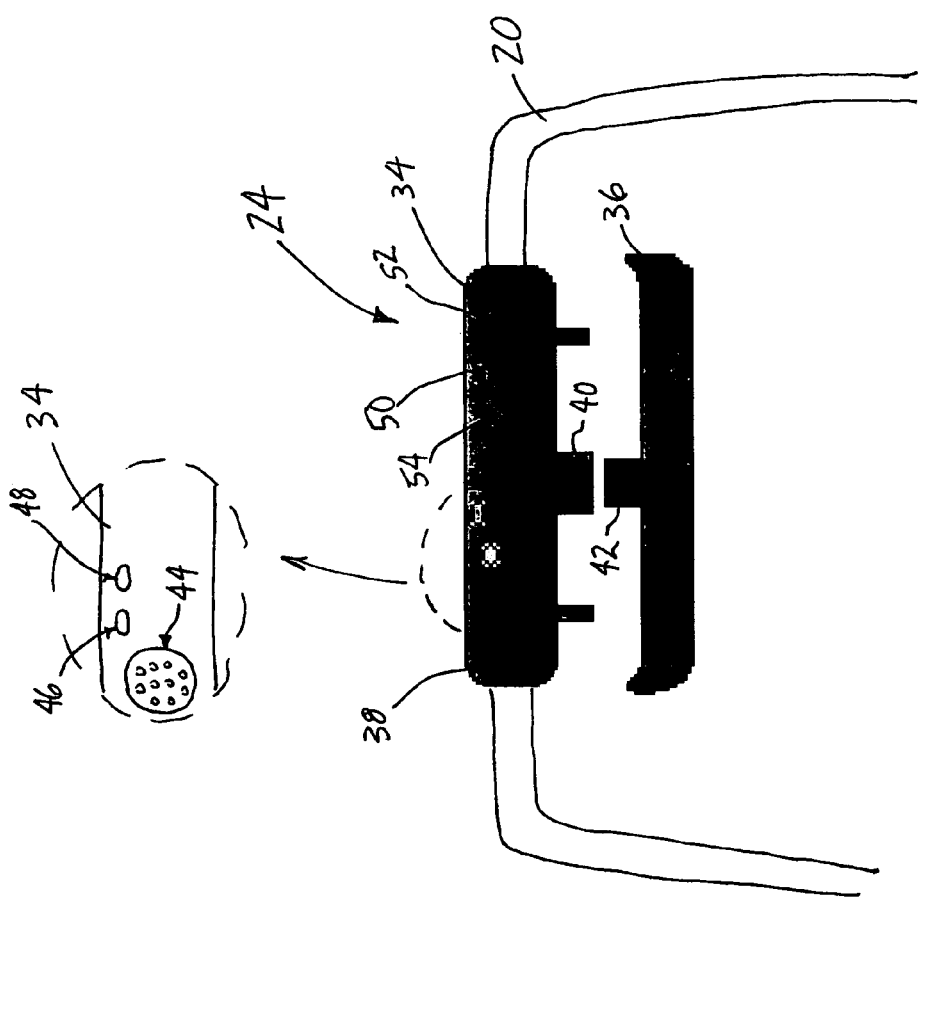
FIG. 4 is a partially exploded side view of a handle-style weight assessment system of the type shown on the handle in FIGS. 2 and 3.

The handle-style weight assessment system 24 will now be described in detail with reference to FIG. 4. In one embodiment, the handle-style weight assessment system 24 includes an upper body portion 34 and a lower body portion 36. The upper body portion 34 is configured to receive the handle 20 therethrough, such as by positioning the handle 20 within an internally disposed bore or similar channel shown in phantom generally at 38. The upper body portion 34 includes a generally hollow receiving member 40 extending downward from the handle 20. The receiving member 40 is dimensioned to receive a protruding element 42 extending upward towards the handle 20 from the lower body portion 36. When the upper and lower body portions 34, 36 are coupled together, the protruding element 42 cooperates with weight assessment features provided in the upper body portion 34 to assess weight for the purpose of preventing back injury according to the present invention.

This may be accomplished, by way of example, by providing mechanical weight assessment devices or components within the upper body portion 34, such as a scale or a spring (not shown) that will engage or otherwise cooperate with the protruding element 42 to assess weight according to the present invention. More specifically, the degree to which the protruding element 42 will engage and press against such mechanical weight assessment devices or components will be a function of the weight of the backpack 22 as transferred to the handle 20. The upper body portion 34 may also be provided with electrical weight assessment devices or components, such as strain gauges, piezoelectric devices (not shown) that will engage or otherwise cooperate with the protruding element 42 to assess weight according to the present invention. Such electrical devices may be powered with internally disposed batteries (not shown) and/or solar cells (not shown).

According to the present invention, the weight assessment system 24 is capable of determining whether the weight of the loaded backpack is below or above a predetermined threshold, which may signify a "safe weight" and/or an "unsafe weight." The predetermined threshold may be set pre-set (such as at the factory) and/or selected by the user (e.g. child) and/or a guardian (e.g. parent and/or school teacher). According to another aspect of the present invention, the predetermined threshold may be in the range of between 10% and 15% of the user's weight. By way of example only, the predetermined threshold may be set as follows:

| User's Weight | Backpack Weight |
| --- | --- |
| 50 lbs | No more than 7.5 lbs |
| 80 lbs | No more than 12 lbs |
| 100 lbs | No more than 15 lbs |
| 130 lbs | No more than 19.5 lbs |

The upper body portion 34 is preferably equipped with any number of manners of alerting the user and/or a guardian if the proposed load is safe or unsafe. For example, an audio alarm 44 may be provided so the user and/or guardian can hear a tone or sound indicating a safe and/or unsafe loading condition. A visual alarm may also be provided so the user and/or guardian can see a light or graphic indicating a safe and/or unsafe loading condition, such as a green light 46 indicating "safe" and a red light 48 indicating "unsafe". Although not shown, a tactile alarm may also be provided so the user and/or guardian can feel a vibration or pulse indicating a safe and/or unsafe loading condition. A display 50 may also be provided for visually illustrating the predetermined threshold and/or the percentage body weight being used to determine the predetermined threshold. In either event, optional adjustment controls 52, 54 may be provided for selectively increasing and decreasing this setting. In one embodiment, the weight assessment system 24 only alerts the user and/or guardian only if the proposed load exceeds the predetermined weight threshold. In another embodiment, the user and/or guardian may also be alerted if the proposed load does not exceed the predetermined weight threshold.

Figure 5:
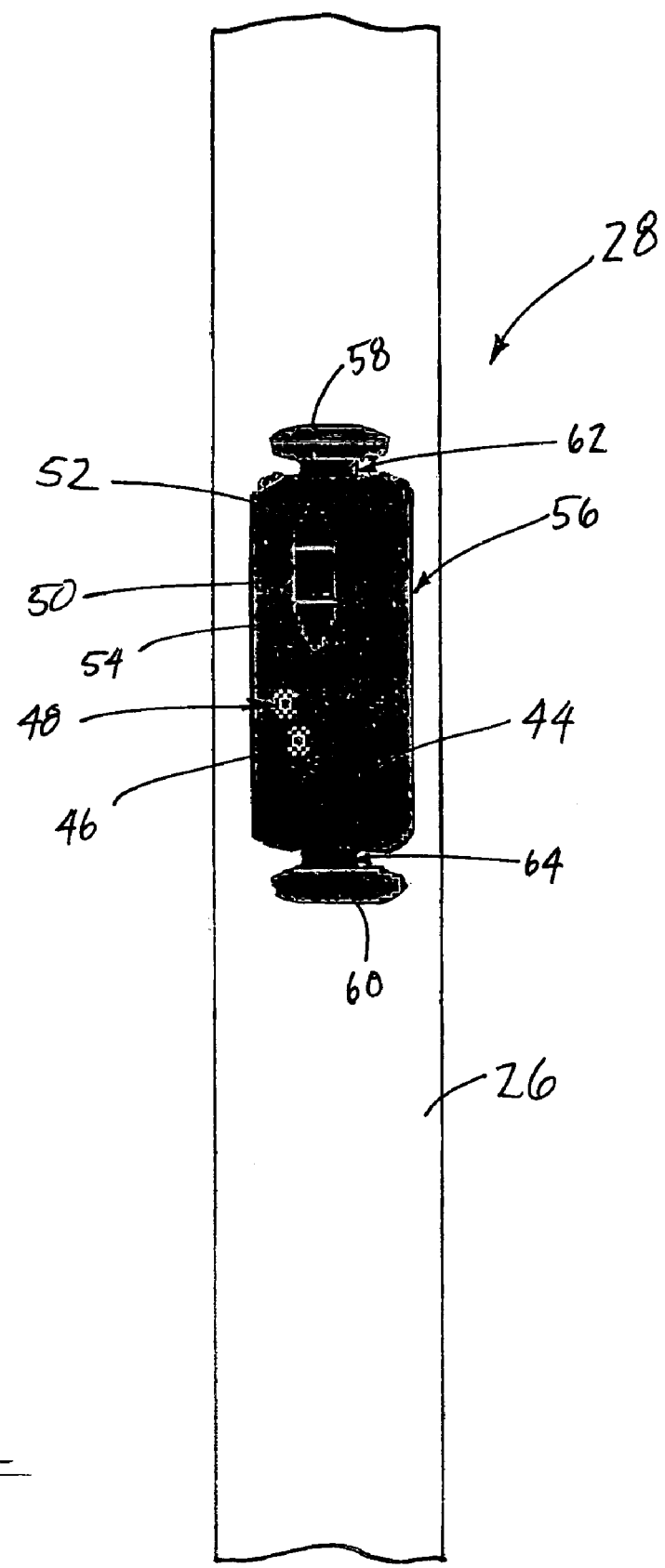
FIG. 5 is a front view of a strap-style weight assessment system of the type shown one of the straps shown in FIG. 2.

The strap-style weight assessment system 28 will now be described in detail with reference to FIG. 5. In one embodiment, the strap-style weight assessment system 28 includes a main body 56 having first and second coupling elements 58, 60 coupled to the strap 26, and first and second translating elements 62, 64 extending from the coupling elements 58, 60, respectively, into engagement or cooperation with weight assessment features disposed within the interior of the main body 56. As with the handle-style embodiment discussed above, these weight assessment features may include mechanical devices or components (e.g. scales, springs, etc. . . . ), electrical devices or components (e.g. strain gauges, piezoelectric devices, etc. . . . ) and/or any combination of the two. As the backpack 22 is picked up by the strap 26, this will cause the translating elements 62, 64 to engage or cooperate with these mechanical and/or electrical devices as a function of the weight of the backpack 22 as transferred to the strap 26. In all other respects, the strap-style weight assessment system 28 may function in the same manner as the handle-style weight assessment system 24 described above, with an audio alarm 44, a visual alarm including a green light 46 and a red light 48, a display 50 and controls 52, 54.

Figure 6:
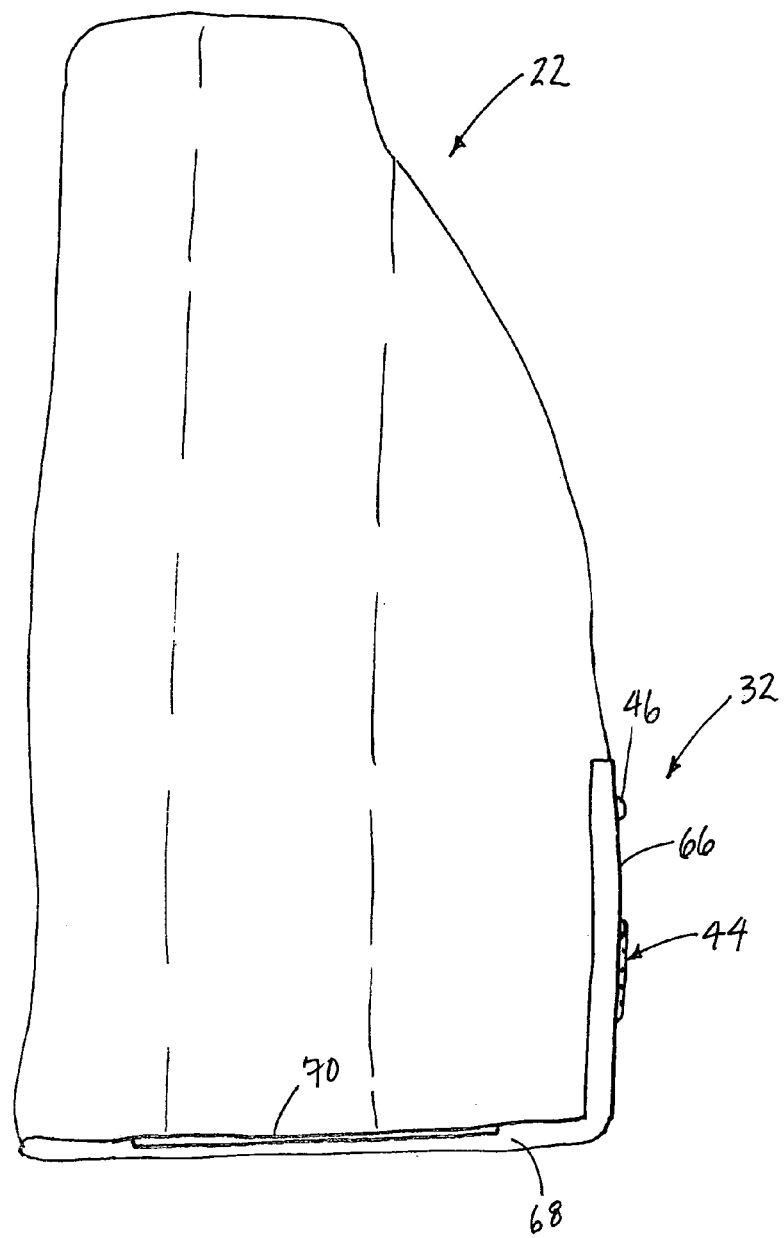
FIG. 6 is a side view of a housing-style weight assessment of the type shown in FIG. 3.

The housing-style weight assessment system 32 will now be described in detail with reference to FIGS. 3 and 6. In one embodiment, the housing-style weight assessment system 32 includes a face portion 66 coupled to the housing 30 and an floor portion 68 forming part or extending beneath the floor or bottom of the backpack 22. The face portion 66 may be equipped with the same features as described above, including the audio alarm 44, a visual alarm including a green light 46 and a red light 48, a display 50 and controls 52, 54. The floor portion 68 includes at least one weight assessment component 70 communicatively coupled to the face portion 66 capable of providing feedback (mechanical and/or electrical) to the housing-style weight assessment system 32 to determine whether a predetermined weight threshold has been exceeded by a proposed backpack load. In all other respects, the operation of the weight assessment system 32 is akin if not identical to those embodiments shown and described above, such that repeat discussion is not necessary.

Any of the handle-style weight assessment system 24, the strap-style weight assessment system 28 and the housing-style weight assessment system 32 may be further equipped with any number of additional features to help enhance the commercial appeal and/or functionality of the system. These additional features may include, but are not necessarily limited to, survival features (e.g. whistle, compass, global positioning system, cellular telephone, mirror, flashlight, etc. . . . ) and multi-media features (e.g. MP3 music player, digital file storage, alarm clock, calculator, voice recorder, personal data, laser, video games, etc. . . . ). By "packaging" the back injury prevention features with such additional features, the present invention may further enhance the commercial appeal to parents and children alike, which will advantageously increase the likelihood of preventing back injury due to backpack overloading.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover all modifications, equivalents, and alternatives falling within the spirit and scope of the invention as defined herein and claimed below.

The invention claimed is:

1. A method of preventing back injury to a user, comprising the steps of:
    (a) determining a weight of a predetermined user;
    (b) equipping a backpack with a weight assessment system;
    (c) having at least one of the user and a guardian of said user select a predetermined threshold by adjusting controls on said weight assessment system, said predetermined threshold defining a safe condition and an unsafe condition based on said weight of said user;
    (d) assessing via said weight assessment system a backpack weight while loaded but before use;
    (e) comparing via said weight assessment system said backpack weight to said predetermined threshold selected in step (c); and
    (f) alerting via said weight assessment system at least one of said user and said guardian if said backpack weight assessed in step (d) results in said safe condition or unsafe condition based on said comparison of said backpack weight to said predetermined threshold in step (e).

2. The method of claim 1, wherein said backpack contains at least one strap.

3. The method of claim 1, wherein said backpack contains at least one handle.

4. The method of claim 1, wherein said weight assessment system uses at least one of a mechanical and an electrical device to measure said weight of said backpack.

5. The method of claim 4, where said mechanical device contains at least one of a scale and a spring.

6. The method of claim 4, wherein said electrical device uses at least one of a piezoelectric device and a strain gauge.

7. The method of claim 2, wherein said weight assessment system is attached to said strap such that said backpack weight is indicated when said backpack is lifted.

8. The method of claim 3, wherein said weight assessment system is attached to said handle such that said backpack weight is indicated when said backpack is lifted.

9. The method of claim 1, wherein said step of alerting is performed by at least one of an audio output device, a visual output device, and a tactile device associated with said backpack.

10. The method of claim 1, wherein said predetermined threshold is a weight ranging from 10% to 15% of said user's weight.

11. A method of preventing back injury to a user, comprising:
    (a) determining a weight of a predetermined user;
    (b) attaching a weight assessment system to a backpack;
    (c) having at least one of the user and a guardian of said user select a predetermined threshold by adjusting controls on said weight assessment system, said predetermined threshold defining a safe condition and an unsafe condition based on said weight of said user;
    (d) assessing via said weight assessment system a backpack weight while loaded but before use;
    (e) comparing via said weight assessment system said backpack weight to said predetermined threshold selected in step (c); and
    (f) alerting via said weight assessment system at least one of said user and said guardian if said backpack weight assessed in step (d) results in said safe condition or unsafe condition based on said comparison of said backpack weight to said predetermined threshold in step (e).

12. The method of claim 11, wherein said backpack contains at least one of a strap and a handle.

13. The method of claim 11, wherein said backpack is equipped with at least one multi-media feature.

14. The method of claim 11, wherein said weight assessment system uses at least one of a mechanical and an electrical device to measure the weight of said backpack load.

15. The method of claim 14 where said mechanical device contains at least one of a scale and a spring.

16. The method of claim 14, wherein said electrical device uses at least one of a piezoelectric device and a strain gauge.

17. The method of claim 12, wherein said weight assessment system is attached to said strap such that the weight of said backpack load is indicated when said backpack is lifted.

18. The method of claim 12, wherein said weight assessment system is attached to said handle such that the weight of said backpack load is indicated when said backpack is lifted.

19. The method of claim 11, wherein said backpack alert is at least one of an audio output device, a visual output device, and a tactile device associated with said backpack.

20. The method of claim 11, wherein said predetermined threshold is a weight ranging from 10-15% of said user's weight.

21. The method of claim 11, wherein said weight assessment system includes at least one survival feature.

22. The method of claim 21, wherein said at least one survival feature includes at least one of a whistle, a compass, a global positioning system, a cellular telephone and a mirror.

23. The method of claim 13, wherein said at least one multi-media feature includes at least one of a music player, a digital file storage device, an alarm clock, a calculator, a voice recorder, a personal data device, a laser, and a video game.

24. The method of claim 1, wherein said weight assessment system includes at least one survival feature.

25. The method of claim 24, wherein said at least one survival feature includes at least one of a whistle, a compass, a global positioning system, a cellular telephone and a mirror.

26. The method of claim 1, wherein said backpack is equipped with at least one multi-media feature.

27. The method of claim 26, wherein said at least one multi-media feature includes at least one of a music player, a digital file storage device, an alarm clock, a calculator, a voice recorder, a personal data device, a laser, and a video game.

* * * * *